(12) United States Patent
Markram et al.

(10) Patent No.: US 11,301,750 B2
(45) Date of Patent: Apr. 12, 2022

(54) SIMPLIFICATION OF NEURAL MODELS THAT INCLUDE ARBORIZED PROJECTIONS

(71) Applicant: Ecole Polytechnique Federale De Lausanne (EPFL), Lausanne (CH)

(72) Inventors: Henry Markram, Lausanne (CH); Wulfram Gerstner, Ecublens VD (CH); Marc-Oliver Gewaltig, Ecublens VD (CH); Christian Rössert, Lucerne (CH); Eilif Benjamin Muller, Preverenges (CH); Christian Pozzorini, Lausanne (CH); Idan Segev, Jerusalem (IL); James Gonzalo King, Lausanne (CH); Csaba Erö, Eculbens VD (CH); Willem Wybo, Prilly (CH)

(73) Assignee: Ecole Polytechnique Federale De Lausanne (EPFL), Lausanne (CH)

( * ) Notice: Subject to any disclaimer, the term of this patent is extended or adjusted under 35 U.S.C. 154(b) by 1017 days.

(21) Appl. No.: 15/942,765

(22) Filed: Apr. 2, 2018

(65) Prior Publication Data
US 2018/0285716 A1 Oct. 4, 2018

Related U.S. Application Data

(60) Provisional application No. 62/479,415, filed on Mar. 31, 2017.

(51) Int. Cl.
*G06N 3/04* (2006.01)
*G06N 3/08* (2006.01)

(52) U.S. Cl.
CPC ............. *G06N 3/049* (2013.01); *G06N 3/08* (2013.01); *G06N 3/082* (2013.01)

(58) Field of Classification Search
CPC ............ G06N 3/04; G06N 3/049; G06N 3/08; G06N 3/082
See application file for complete search history.

(56) References Cited

U.S. PATENT DOCUMENTS

| 7,827,124 B2 * | 11/2010 | McKinstry | G05B 13/04 706/14 |
| 2016/0019456 A1 * | 1/2016 | Annapureddy | G06N 3/04 706/22 |

OTHER PUBLICATIONS

Iakymchuk et al. "Simplified spiking neural network architecture and STDP learning algorithm applied to image classification", EURASIP Journal on Image and Video Processing, 2015, pp. 11.*

(Continued)

*Primary Examiner* — Li Wu Chang
(74) *Attorney, Agent, or Firm* — Fish & Richardson P.C.

(57) ABSTRACT

The simplification of neural network models is described. For example, a method for simplifying a neural network model includes providing the neural network model to be simplified, defining a first temporal filter for the conveyance of input from a neuron to an other spatially-extended neuron along the arborized projection, defining a second temporal filter for the conveyance of input from yet another neuron to the spatially-extended neuron along the arborized projection, replacing, in the neural network model, the first, spatially-extended neuron with a first, spatially-constrained neuron and the arborized projection with a first connection extending between the first, spatially-constrained neuron and the second neuron, wherein the first connection filters input from the second neuron in accordance with the first temporal filter and a second connection extending between the first spatially-constrained neuron and the third neuron.

19 Claims, 7 Drawing Sheets

(56) References Cited

OTHER PUBLICATIONS

Berger et al., "High /h channel density in the distal apical dendrite of layer V pyramidal cells increases bidirectional attenuation of EPSPs," *J Neurophysiology.*, 85(2):855-868, Feb. 2001.
Bruderle et al., "A comprehensive workflow for general-purpose neural modeling with highly con gurable neuromorphic hardware systems," *Biological Cybernetics.*, 104(4):263-296, 2011.
Bruderle., "Establishing a novel modeling tool: a python-based interface for a neuromorphic hardware system," *Front Neuroinform.*, 3:17, Jun. 5, 2009, 10 pages.
Davison et al., "PyNN: A common interface for neuronal network simulators," *Front Neuroinformatics.*, 2:11, 2008.
De Koninck and Mody., "Endogenous GABA Activates Small-Conductance K+ Channels Underlying Slow IPSCs in Rat Hippocampal Neurons," 77(4):2202-2208, Apr. 1997.
Destexhe et al., "The high-conductance state of neocortical neurons in vivo," *Nat Rev Neurosci.*, 4(9):739-751, Sep. 2003.
Eliasmith and Trujillo., "The use and abuse of large-scale brain models" *Current Opinion in Neurobiology.*, 25:1-6, Apr. 2014.
Eliasmith et al., "A large-scale model of the functioning brain," *Science.*, 338(6111):1202-1205, Nov. 30, 2012.
Fidjeland and Shanahan., "Accelerated simulation of spiking neural networks using GPUs," *Neural Networks (IJCNN), The 2010 International Joint Conference on.*, pp. 1-8.
Fuhrmann et al., "Coding of temporal information by activity-dependent synapses," *J Neurophysiol.*, 87(1): 140-148, Jan. 2002.
Galluppi et al., (2010). Neural Information Processing. Theory and Algorithms: 17th International Conference, ICONIP 2010, Sydney, Australia, Nov. 22-25, 2010, Proceedings, Part I, Chapter A General-Purpose Model Translation System for a Universal Neural Chip, pp. 58-65. Berlin, Heidelberg: Springer Berlin Heidelberg.
Gewaltig and Diesmann,, "Nest (NEural simulation tool)," Scholarpedia 2(4): 1430, 2007.
Goodman and Brette., "Brian: a simulator for spiking neural networks in python," *Front Neuroinform.*, 2:5, 2008, 10 pages.
Gupta et al., "Organizing Principles for a Diversity of GABAergic Interneurons and Synapses in the Neocortex," *Science.*, 287(5451):273-278, Jan. 14, 2000.
Gustavsen and Semiyen., "Rational approximation of frequency domain responses by vector fitting," *IEEE Transaction on Power Delivery,.* 14(3):1052-1061, Jul. 1999.
Hanke and Halchenko,, "Neuroscience runs on GNU/linux," *Front Neuroinform.*, 5(8), Jul. 2011.
Hausser and Roth, "Estimating the time course of the excitatory synaptic conductance in neocortical pyramidal cells using a novel voltage jump method," *J Neurosci.*, 17(20):7606-7625, Oct. 15, 1997.
Hines and Carnevale., "The neuron simulation environment," *Neural Comput.*, 9(6):1179-1209, Aug. 15, 1997.
Jahr and Stevens., "A quantitative description of NMDA receptor channel kinetic behavior," *J Neurosci.*, 10(6):1830-1837, Jun. 1990.
Jolivet et al., "Generalized Integrate-and-Fire Models of Neuronal Activity Approximate Spike Trains of a Detailed Model to a High Degree of Accuracy," *J Neurophysiol.*, 92(2):959-976, Aug. 2004.
Khazipov et al., "Hippocampal CAI lacunosummoleculare interneurons: modulation of monosynaptic GABAergic IPSCs by presynaptic GABAB receptors," *J Neurophysiol.*, 74(5):2126-2137, Nov. 1995.
Koch, C. (1998). Biophysics of Computation: Information Processing in Single Neurons (Computational Neuroscience) (1 ed.). Oxford University Press.
London and Hausser., "Dendritic Computation. Annual Review of Neuroscience," 28(1):503-532, Jul. 21, 2005.

Luczak et al., "Sequential structure of neocortical spontaneous activity in vivo," *PNAS.*, 104(1):347-352, Jan. 2, 2007.
Maass et al., "Fading memory and kernel properties of generic cortical microcircuit models," *J Physiol Paris.*, 98(4-6):315-330, Jul.-Nov. 2004.
Marasco et al., "Fast and accurate low-dimensional reduction of biophysically detailed neuron models," *Sci Rep.*, 2:928, 2012.
Marasco et al., "Using strahler's analysis to reduce up to 200-fold the run time of realistic neuron models," *Sci Rep.*, 3:2934, Oct. 14, 2013.
Markram "Differential Signaling via the Same Axon of Neocortical Pyramidal Neurons," *PNAS.*, 95(9):5323-5328, Apr. 28, 1998.
Markram et al., "Reconstruction and Simulation of Neocortical Microcircuitry," *Cell.*, 163(2):456-492, 2015.
Mott et al., "GABAB-Receptor-Mediated Currents in Interneurons of the Dentate-Hilus Border," *J Neurophysiol.*, 82(3)4438-1450, Sep. 1, 1999.
Muller et al., "Spike-frequency adapting neural ensembles: beyond mean adaptation and renewal theories," *Neural Comput.*, 19(11):2958-3010, Nov. 2007.
Nageswaran et al., "A configurable simulation environment for the efficient simulation of large-scale spiking neural networks on graphics processors," *Neural networks.*, 22(5-6):791-800, Jul.-Aug. 2009.
Nevian et al., "Properties of basal dendrites of layer 5 pyramidal neurons: a direct patch-clamp recording study," *Nature Neuroscience.*, 10(2):206-214, Jan. 7, 2007.
Pozzorini et al., "Automated High-Throughput Characterization of Single Neurons by Means of Simplified Spiking Models," *PLOS Comput Biol.*, 11(6):e1004275, Jun. 17, 2015.
Rall., "Distinguishing theoretical synaptic potentials computed for different soma-dendritic distributions of synaptic input," *J Neurophysiol.*, 30(5):1138-1168, Sep. 1967.
Ramaswamy et al., "Intrinsic morphological diversity of thick-tufted layer 5 pyramidal neurons ensures robust and invariant properties of in silico synaptic connections," *J Physiol.*, 590(4):737-752, Feb. 15, 2012.
Renart et al., "Mean-field theory of irregularly spiking neuronal populations and working memory in recurrent cortical networks," *Computational Neuroscience: A Comprehensive Approach.*, 431-490, 2004.
Reyes-Puerta et al., "Laminar and Columnar Structure of Sensory-Evoked Multineuronal Spike Sequences in Adult Rat Barrel Cortex In Vivo," *Cerebral Cortex.*, 25(8):2001-2021, Aug. 1, 2015.
Thorpe, S. (2002). Biologically Motivated Computer Vision: Second International Workshop, BMCV 2002 Tubingen, Germany, Nov. 22-24, 2002 Proceedings, Chapter Ultra-Rapid Scene Categorization with a Wave of Spikes, pp. 1-15. Berlin, Heidelberg: Springer Berlin Heidelberg.
Tsodyks and Markram., "The neural code between neocortical pyramidal neurons depends on neurotransmitter release probability," *PNAS USA.*, 94(10):5495, 719-723, 1997.
Williams and Stuart, "Dependence of epsp e cacy on synapse location in neocortical pyramidal neurons," *Science.*, 295(5561), 1907-1910, Mar. 8, 2002.
Wybo et al., "A Sparse Reformulation of the Green's Function Formalism Allows E cient Simulations of Morphological Neuron Models," *Neural Computation.*, 27(12):2587-2622, Dec. 2015.
Wybo et al., "The Green's function formalism as a bridge between single- and multi-compartmental modeling," *Bio Cybern.*, 107(6):685-694, Sep. 14, 2013.
Yavuz et al., "GeNN: a code generation framework for accelerated brain simulations," *Scientific Reports.*, 6:18854, Jan. 7, 2016.
Zenke et al., "Diverse synaptic plasticity mechanisms orchestrated to form and retrieve memories in spiking neural networks," *Nature communications.*, 6:6922, 2015.

\* cited by examiner

SIMPLIFICATION OF NEURAL MODELS THAT INCLUDE ARBORIZED PROJECTIONS

TECHNICAL FIELD

This disclosure relates to the simplification of neural network models, e.g., of morphologically detailed models.

BACKGROUND

Accuracy and efficiency are competing interests in neural network models, and devices such as neuromorphic computational devices that embody neural network models. In particular, although a highly detailed model of a neural network may be appropriate in some contexts, in other contexts simplified versions may be better suited. For example, neuromorphic computational devices may be implemented that provide brain-inspired architectures without exhaustive details of cellular and synaptic anatomy and physiology. As another example, meaningful experimental investigations may be conducted with limited computing resources if a neural network model is simplified in a way that retains relevant detail.

SUMMARY

Systems and techniques for the simplification of neural network models are described.

For example, in a first implementation, a method for simplifying a neural network model includes providing the neural network model to be simplified, the neural network model comprising a first, spatially-extended neuron having an arborized projection that connects to a second neuron and to a third neuron, wherein the arborized projection is to convey input from the second neuron and the third neuron to the first neuron, defining a first temporal filter for the conveyance of input from the second neuron to the first, spatially-extended neuron along the arborized projection, defining a second temporal filter for the conveyance of input from the third neuron to the first, spatially-extended neuron along the arborized projection, wherein the first temporal filter differs from the second temporal filter, replacing, in the neural network model, a) the first, spatially-extended neuron with a first, spatially-constrained neuron, and b) the arborized projection with i) a first connection extending between the first, spatially-constrained neuron and the second neuron, wherein the first connection filters input from the second neuron in accordance with the first temporal filter and ii) a second connection extending between the first spatially-constrained neuron and the third neuron, wherein the second connection filters input from the third neuron in accordance with the second temporal filter.

This and other implementations can include one or more of the following features. The first and second temporal filters can weigh input to the first neuron differently. The first and second temporal filters can be convolutional filters. For example, the first and second temporal filters can be exponential functions. Defining the first and second temporal filters can include estimating an effective attenuation and delay that input from a respective of the second and the third neuron to the first spatially-extended neuron would experience along the arborized projection. The approximation can be conducted with a presumed average background activity within the neural network model. Estimating the effective attenuation and the delay can include estimating a first effective attenuation and a first delay for the second neuron and approximating a second effective attenuation and a second delay for the third neuron based on the first effective attenuation and the first delay.

Defining the first temporal filter can include calculating a signal conveyed to the first spatially-extended neuron in response to the input from the second neuron along the arborized projection and calculating a kernel that yields approximately the same signal being conveyed to the first, spatially-constrained neuron but in response to the input from the second neuron being located at the first, spatially-constrained neuron. Calculating the kernel can include determining a ratio of a) the input from the second neuron along the arborized projection, expressed in the frequency domain to b) the signal conveyed to the first, spatially-extended neuron in response to the input, expressed in the frequency domain.

In a second implementation, a method for simplifying a neural network model includes providing the neural network model to be simplified, the neural network model comprising a first, spatially-extended neuron having an arborized projection that connects to a second neuron and to a third neuron, wherein the arborized projection is to convey input from the second neuron and the third neuron to the first neuron, defining a first weight for the conveyance of input from the second neuron to the first, spatially-extended neuron along the arborized projection, defining a second weight for the conveyance of input from the third neuron to the first, spatially-extended neuron along the arborized projection, wherein the first weight differs from the second weight, replacing, in the neural network model, a) the first, spatially-extended neuron with a first, spatially-constrained neuron, and b) the arborized projection with i) a first connection extending between the first, spatially-constrained neuron and the second neuron, wherein the first connection weights input from the second neuron in accordance with the first weight and ii) a second connection extending between the first, spatially-constrained neuron and the third neuron, wherein the second connection weights input from the third neuron in accordance with the second weight.

This first, the second, and other implementations can include one or more of the following features. The first, spatially-constrained neuron can be a point neuron model. For example, the point neuron model can be a Generalized Integrate-and-Fire point neuron model. The first temporal filter or the first weight can be defined to model a first effective post-synaptic response for a first synapse of a nerve cell. The second temporal filter or the second weight can be defined to model a second effective post-synaptic response for a second synapse of the nerve cell. The first connection can be an inhibitory connection. The second connection can be an excitatory connection. The first, spatially-extended neuron can include a plurality of arborized projections that each connects to a plurality of other neurons. The method can include defining respective temporal filters for each connection of each of the arborized projections and replacing, in the neural network model, the arborized projections with connections that extend between the first, spatially-constrained neuron and respective of the plurality of other neurons. Each connection can filter input from one of the neurons in accordance with the respective temporal filter. The neural network model to be simplified can include a plurality of spatially-extended neurons each having at least one arborized projection that connects to others of the neurons. The method can also include defining temporal filters for each of the connections of the arborized projections and replacing, in the neural network model, the arborized projections with connections extending between spatially-constrained replacements for the spatially-extended neurons. Each connection can filter input in accordance with a respective of the temporal filters. The plurality of spatially-extended neurons can be grouped into categories. For example, the spatially-extended neurons can be grouped into morphological subtypes. Defining of temporal filters or the weights can be based on the category of the classification. A first subset of the connections can be inhibitory connections. A second subset of the connections are excitatory connections.

The method can include classifying the arborized projection of the first spatially-extended neuron as either a basal projection or an apical projection. The definition of the first temporal filter or the first weight and the second temporal filter of the second weight can be based on the classification of the arborized projection. The method can include defining a first delay for the conveyance of input from the second neuron to the first, spatially-extended neuron along the arborized projection, and defining a second delay for the conveyance of input from the third neuron to the first, spatially-extended neuron along the arborized projection, wherein the first delay differs from the second delay. The definition of the first and the second delay can be based on the classification of the arborized projection. The method can include classifying a first arborized projection that has an excitatory contact at a distance as a basal projection and classifying a second arborized projection that has an excitatory contact at the same distance as an apical projection. An attenuation due to a temporal filter of the excitatory contact of the first arborized projection can be less than an attenuation due to a temporal filter of the excitatory contact of second arborized projection. The definition of the first temporal filter and the second temporal filter can be based on a presumed average background activity within the neural network model. The number of individual temporal filters or weights can be reduced by grouping them into a few classes, for example, by using k-means clustering.

The neural network model to be simplified can be a biophysical model of a biological neural network. A point neuron representation can embody a neural network model that has been simplified according to the first implementation, the second implementation, or other implementations, including the possible features of those implementations.

A neuromorphic computational device can embody a neural network model that has been simplified according to the first implementation, the second implementation, or other implementations, including the possible features of those implementations.

A point neuron representation can embody a neural network model that has been simplified according to the first implementation, the second implementation, or other implementations, including the possible features of those implementations.

A non-transitory computer-readable medium can store software comprising instructions executable by one or more computers which, upon such execution, cause the one or more computers to perform operations comprising the first implementation, the second implementation, or other implementations, including the possible features of those implementations.

The details of one or more implementations are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Biological neural networks (e.g., the brain) are formed by a series of interconnected neurons. These neurons generally interact with their neighbors via axon terminals that form synapses with dendrites of other neurons. Action potentials and other electrical changes can be triggered or inhibited when certain electrical and/or chemical signals are input. These changes at the synapses propagate along the dendrites and to the soma, which responds accordingly.

In real-world biological systems, these mechanisms are both complex and incompletely understood. Nevertheless, biological neural networks have been at least partially characterized and researchers have used these characterizations to model biological neural networks in various levels of detail. Some of these models include extensive detail regarding, e.g., location and characteristics of synaptic connections, the morphology of neurons, the structure and distribution of chemoreceptors, membrane properties, and other real-world detail.

Despite the success of many such detailed models, point-neuron network models are still widely used in theoretical neuroscience to describe various functions of neural networks. Point-neuron network models are relatively easier to analyze and numerically light-weight, making them suitable for real-time and accelerated execution on GPU-based and neuromorphic platforms.

However, point-neuron network models generally have been generated using ad hoc assumptions that are unconstrained by the limits of real-world biological systems. As a result, such point-neuron network models are disjunct from modern experimental neuroscience.

The systems and techniques described herein can help bridge the gap between detailed models and point-neuron network models by deriving point-neuron networks from the detailed network models in an automated, repeatable and quantitatively verifiable way. The resultant point-neuron network models are driven by the characteristics of real-world biological systems. Indeed, the point-neuron network models can be continuously updated to integrate the latest experimental data, without the need for human intervention.

Figure 1:
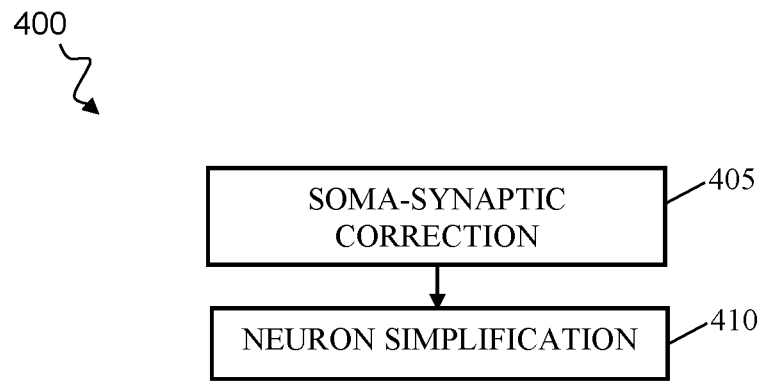
FIG. 1 is a flowchart of a process for simplifying neural network models.

FIG. 1 is a flowchart of a process 100 for simplifying neural network models such as, e.g., morphologically-detailed microcircuit models of neural networks. Process 100 can be performed by a system of one or more data processing apparatus that perform operations in accordance with the logic of one or more sets of machine-readable instructions. For example, process 100 can be performed by that same system of one or more computers that executes software for the model that is to be simplified.

The system performing process 100 performs a soma-synaptic correction at 105. In effect, soma-synaptic correction "moves" biophysically detailed models of synapses which excite or inhibit different dendritic branches of a neuron into the soma. Arborized projections connect one neuron to second and third neurons and can convey input from the second and third neurons to the first neuron. The synapses can be "moved" by replacing the detailed synapses with a numerical filter that approximates the post-synaptic response of each synapse. In general, the numerical filter can be a temporal filter and/or a weighting filter and account for either or both of dendritic delay and dendritic attenuation. In some implementations, the numerical filter can account for transformations of synaptic responses due to intermingling along the dendrites.

For example, soma-synaptic correction can model the synaptic current at the soma ($i_{syn\ soma}$) as a low-pass filtered version of the synaptic current at a remote excitatory or inhibitory synapse ($i_{syn}$), or $$\tau \frac{d}{dt} i_{syn\ soma} = -i_{syn\ soma} + w \cdot i_{syn} \qquad \text{Equation 1}$$

where $w/\tau$ and $\tau$ are the amplitude and time constant of the filter, respectively. Such a filter approximates the effective attenuation and delay that a synaptic current would experience when flowing from a location on the dendrite to the soma.

The parameters of such a filter need not be based on the behavior of a passive neuron. Rather, the parameters of such a filter can be approximated based on the modeled behavior of a neuron in vivo, i.e., under physiological conditions. In some implementations, the parameters can account for first order effects of the interaction of dendritic non-linearities with on-going synaptic activity and their role in altering dendritic properties such as input resistance and shunting inhibition. The behavior of the neuron in vivo can be approximated from the behavior of the neuron in a simulated network with physiological levels of depolarization and extracellular calcium. For example, the parameters of such a filter can be approximated with 100% rheobase and an extracellular calcium concentration $[Ca^{2+}]=1.25$ mM.

As discussed further below, in some implementations, the parameters of such a filter can be approximated using, e.g., an implicit filter extraction (IFE) method that uses PRAXIS optimization and/or a direct filter extraction (DFE) method that uses a Green's function approach.

The system performing process 100 performs a neuron simplification at 410. Ideally, simplification of a neuron would express the entire biophysical complexity of a neuron that is found in a morphologically-detailed model in a set of computationally-adept parameters. In practice, some biophysical detail is inevitably lost during simplification. Nevertheless, a neural network model formed using simplified neurons can be provide insights into network behavior and, in some cases, may provide meaningful data processing capabilities.

In a neuron simplification, approximations of the stimulation received by the soma of different neurons (e.g., the approximations derived during soma-synaptic correction) can be used to define a simplified model for each individual neuron in the network. Further, biophysical detail of the neuron itself can be expressed in computationally-adept parameters. For example, each individual neuron can be modeled using a Generalized Integrate-and-Fire (GIF) model.

In spiking neuron models, action potentials are generated by a threshold process, i.e., a neuron spikes whenever a variable (generally, transmembrane potential) reaches a threshold. In Integrate-and-Fire models, an input current is integrated over time until the threshold is reached and an action potential results. Integrate-and-fire models can be adapted to more accurately embody the real-world behavior of neurons with varying levels of detail. For example, some integrate-and-fire models can model refractory periods in neurons. As another example, integrate-and-fire models can also be made "leaky" to model the diffusion of ions through the membrane at non-equilibrium states. In some implementations, integrate-and-fire models can account for spike-rate adaptation and/or include time-dependent parameters.

In some implementations, the neuron simplification treats the morphologically-detailed models—at in vivo-like conditions and background activity—as an operating point. Various characteristics of each neuron at this operating point—such as, e.g., resting synaptic current and membrane potential—can be used to compute parameters for the simplified neurons.

Filter Parameter Approximation

As discussed above, during soma-synaptic correction, a low-pass filter can be used to model dendritic filtering of synaptic responses.

Implicit Filter Extraction (IFE): In some implementations, the parameters of such a filter can be estimated by an implicit filter extraction (IFE) method. In IFE, the parameters of a filter are extracted from the morphologically-detailed model by selecting parameters that comport well with the behavior of groups of synapses within the morphologically-detailed model.

Figure 2:
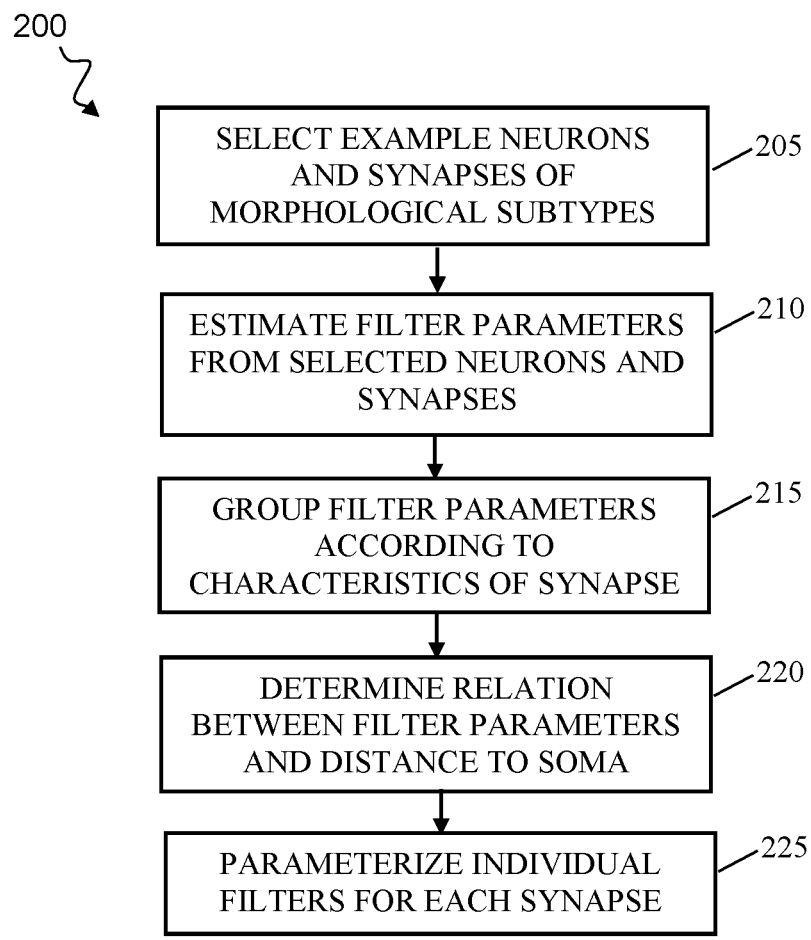
FIG. 2 is a flowchart of a process for estimating the parameters of a filter using implicit filter extraction.

FIG. 2 is a flowchart of a process 200 for estimating the parameters of a filter using implicit filter extraction. In some implementations, process 200 can be performed as part of a soma-synaptic correction in a process for simplifying neural network models (e.g., at 105 in process 100, FIG. 1).

The system performing process 200 selects example neurons, and synapses of those neurons, from amongst the morphological subtypes that appear in a morphologically-detailed model of a neural networks at 205. In some implementations, the neurons and their respective synapses can be selected at random within each subtype. For example, in some implementations, 100 or so synapses can be selected at random on each of a number of neurons that are themselves selected at random from amongst the neurons of each morphological subtype.

The system performing process 200 also estimates the filter parameters from the selected neurons and synapses at 210. The filter parameters can be estimated by selecting parameters that comport well with the behavior of groups of synapses (and neurons) within the morphologically-detailed model. In some implementations, the estimation of the filter parameters can be viewed as an optimization problem and can be performed using, e.g., Brent's Principal Axis algorithm.

The system performing process 200 also separates the filter parameters into different groups at 215. The groups can be based on the characteristics of the corresponding synapse in the morphologically-detailed model. For example, in some implementations, the filter parameters can be grouped according to whether the corresponding synapse is an inhibitory or excitatory synapse. As another example, the filter parameters can be grouped according to whether the corresponding synapse located on an apical or basal dendrite. As another example, the filter parameters can be grouped according to whether the corresponding synapse is an inhibitory synapse located on an apical dendrite, an inhibitory synapse located on a basal dendrite, an excitatory synapse located on an apical dendrite, or an excitatory synapse located on a basal dendrite. Such a separation allows the distinct attenuation properties of apical and basal dendrites to be considered.

For each different group, the system performing process 200 also determines a relationship between the filter parameters and the distance between the corresponding synapse and the soma at 220. For example, the filter parameters can be fit to a mathematical function of the distance to the soma. In some implementations, the time constant $\tau$ of the filter can be fit to a linear function of the distance and the amplitude $w/\tau$ of the filter can be fit to an exponential function of the distance. For example, the time constant $\tau$ of the filter can be fit to $$\tau(d) = \tau_0 + d \cdot s, \qquad \text{Equation 2}$$

where s is the slope in units of ms/μm and $\tau_0$ is 1e-9 ms. The amplitude $w/\tau$ of the filter can be fit using $$w(d) = \exp(d/-l) \qquad \text{Equation 3}$$

where l is the length constant in micrometers. In both Equation 2 and 3, d is the dendritic path length to the soma in micrometers.

Figure 3:
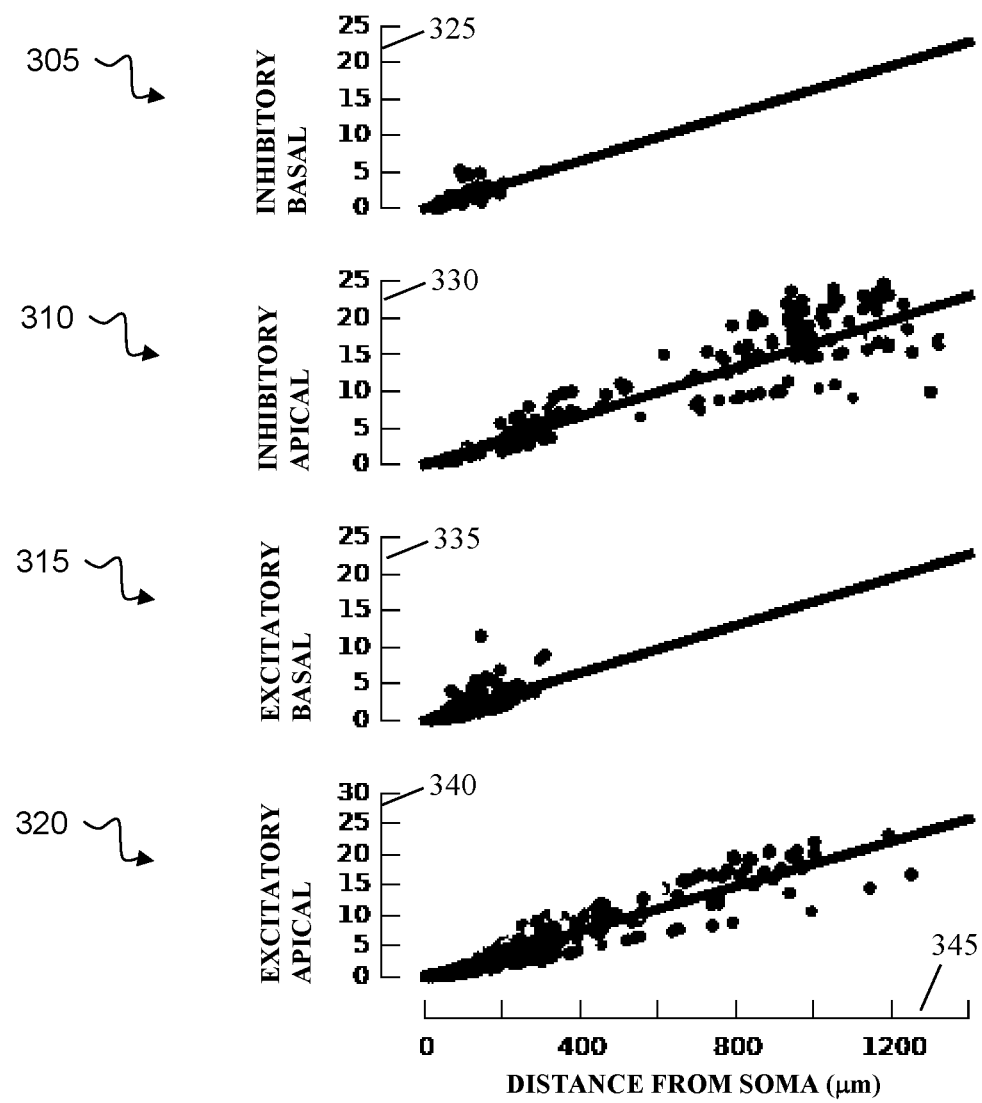
FIG. 3 is a collection of graphs each showing implementations of determinations of the relationship between the time constant of various filters and distance between the synapse and the soma.

FIG. 3 is a collection of graphs 305, 310, 315, 320 each showing implementations of determinations of the relationship between the time constant $\tau$ of various filters and distance between the synapse and the soma. In particular, graph 305 illustrates a determination of the relationship between the time constant $\tau$ of a filter for inhibitory synapses located on basal dendrites and distance from the soma. Graph 310 illustrates a determination of the relationship between the time constant $\tau$ of a filter for inhibitory synapses located on apical dendrites and distance from the soma. Graph 315 illustrates a determination of the relationship between the time constant $\tau$ of a filter for excitatory synapses located on basal dendrites and distance from the soma. Graph 320 illustrates a determination of the relationship between the time constant $\tau$ of a filter for excitatory synapses located on apical dendrites and distance from the soma.

Graphs 305, 310, 315, 320 all refer to a common X-axis 345. Graphs 305, 310, 315, 320 each include a respective Y-axis 325, 330, 335, 340. Position along X-axis 345 indicates the distance the synapses from the soma in micrometers. Position along Y-axes 325, 330, 335, 340 indicates time of the time constant in milliseconds. The thick black lines in graphs 305, 310, 315, 320 indicate a best linear fit for the variation of the time constant with respect to distance. For example, in graph 305, the time constant $\tau$ for inhibitory synapses located on basal dendrites can be fit to distance from the soma by the linear equation $\tau = \tau_0 + 0.016$ d, where $\tau$ is given in milliseconds and d is given in micrometers. Graphs 310, 315 show the time constant for inhibitory synapses located on apical dendrites and the time constant for excitatory synapses located on basal dendrites fit to distance from the soma by the same linear equation. Graph 320 shows the time constant for excitatory synapses located on apical dendrites fit to distance from the soma by the linear equation $\tau = \tau_0 + 0.018$ d.

Figure 4:
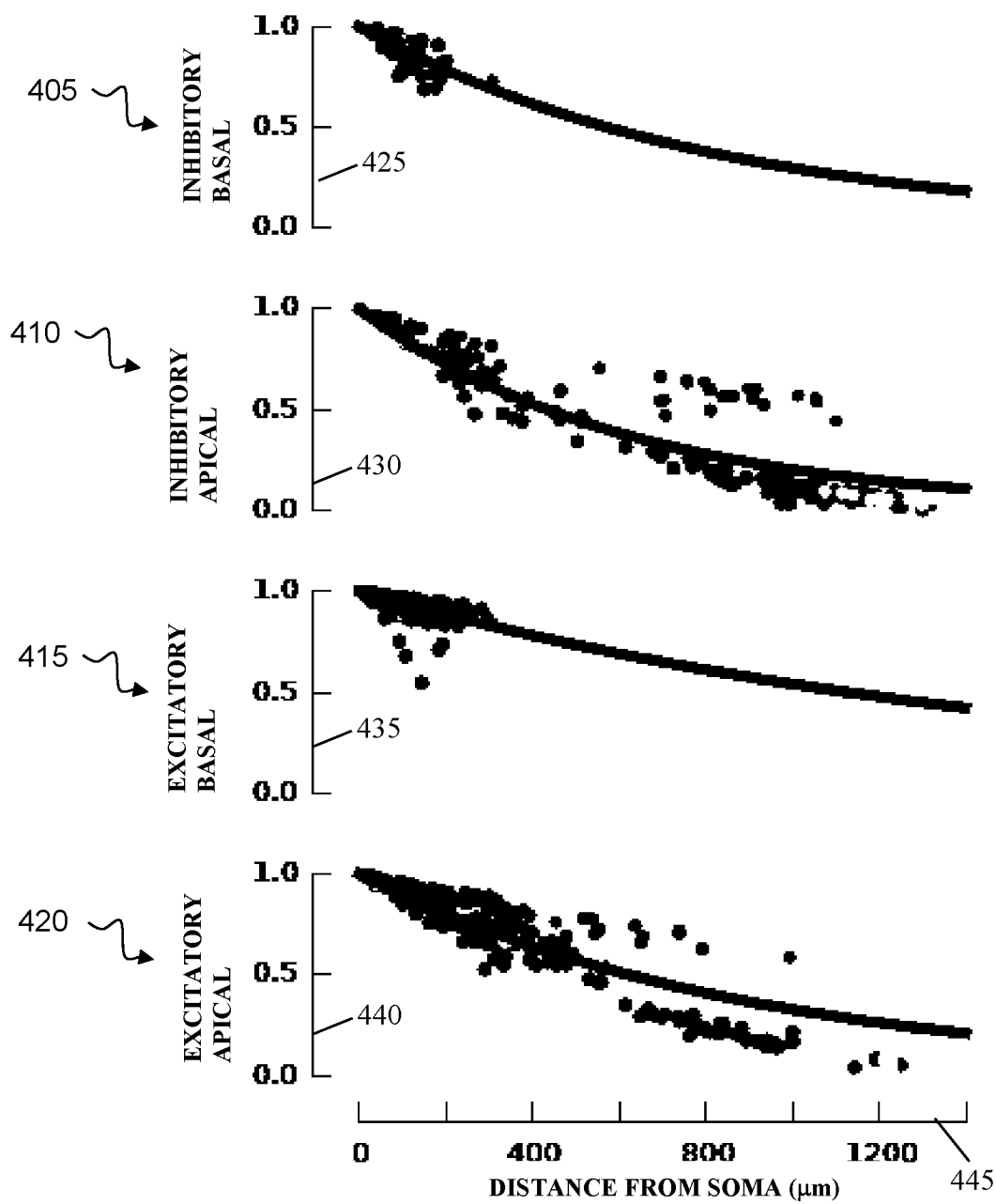
FIG. 4 is a collection of graphs each showing implementations of determinations of the relationship between the amplitude of various filters and the distance between the synapse and the soma.

FIG. 4 is a collection of graphs 405, 410, 415, 420 each showing implementations of determinations of the relationship between the amplitude $w/\tau$ of various filters and the distance between the synapse and the soma. In particular, graph 405 illustrates a determination of the relationship between the amplitude $w/\tau$ of a filter for inhibitory synapses located on basal dendrites and distance from the soma. Graph 410 illustrates a determination of the relationship between the amplitude $w/\tau$ of a filter for inhibitory synapses located on apical dendrites and distance from the soma. Graph 415 illustrates a determination of the relationship between the amplitude $w/\tau$ of a filter for excitatory synapses located on basal dendrites and distance from the soma. Graph 420 illustrates a determination of the relationship between the amplitude $w/\tau$ of a filter for excitatory synapses located on apical dendrites and distance from the soma.

Graphs 405, 410, 415, 420 all refer to a common X-axis 445. Graphs 405, 410, 415, 420 each include a respective Y-axis 425, 430, 435, 440. Position along X-axis 445 indicates the distance the synapses from the soma in micrometers. Position along Y-axes 425, 430, 435, 440 indicates a unitless amplitude $w/\tau$ (Equation 1). The thick black lines in graphs 405, 410, 415, 420 indicate a best exponential fit for the variation of the amplitude with respect to distance. For example, in graph 405, the amplitude $w/\tau$ for inhibitory synapses located on basal dendrites can be fit to distance from the soma by the exponential equation $w = \exp(d/-824)$, where d is given in micrometers. In graph 410, the amplitude $w/\tau$ for inhibitory synapses located on apical dendrites can be fit to distance from the soma by the exponential equation $w = \exp(d/-627)$, where d is given in micrometers. In graph 415, the amplitude $w/\tau$ for excitatory synapses located on basal dendrites can be fit to distance from the soma by the exponential equation $w = \exp(d/-1621)$, where d is given in micrometers. In graph 420, the amplitude $w/\tau$ for excitatory synapses located on apical dendrites can be fit to distance from the soma by the exponential equation $w = \exp(d/-895)$, where d is given in micrometers.

Returning to FIG. 2, the system performing process 200 also parameterizes individual filters for each synapse at 225. For each synapse, parameters (such as amplitude $w/\tau$ and time constant $\tau$ in Equation 1) of a filter that model the behavior of that synapse can be calculated using an appropriate relationship between the filter parameters and the distance between the corresponding synapse and the soma. As discussed above, the appropriate relationship can reflect the characteristics of the synapse. For example, the appropriate relationship can be a fit of a mathematical function to the characteristics of the groups of synapses, such as Equations 1, 2.

Direct Filter Extraction (DFE): In some implementations, the parameters of a filter can be estimated by a direct filter extraction (DFE) method. In DFE, the parameters of a filter are extracted from the morphologically-detailed model by selecting parameters that comport well with the behavior of individual synapses within the morphologically-detailed model. Filter parameters can be estimated directly for individual synapses from the behavior of those synapses in the morphologically-detailed model.

Figure 5:
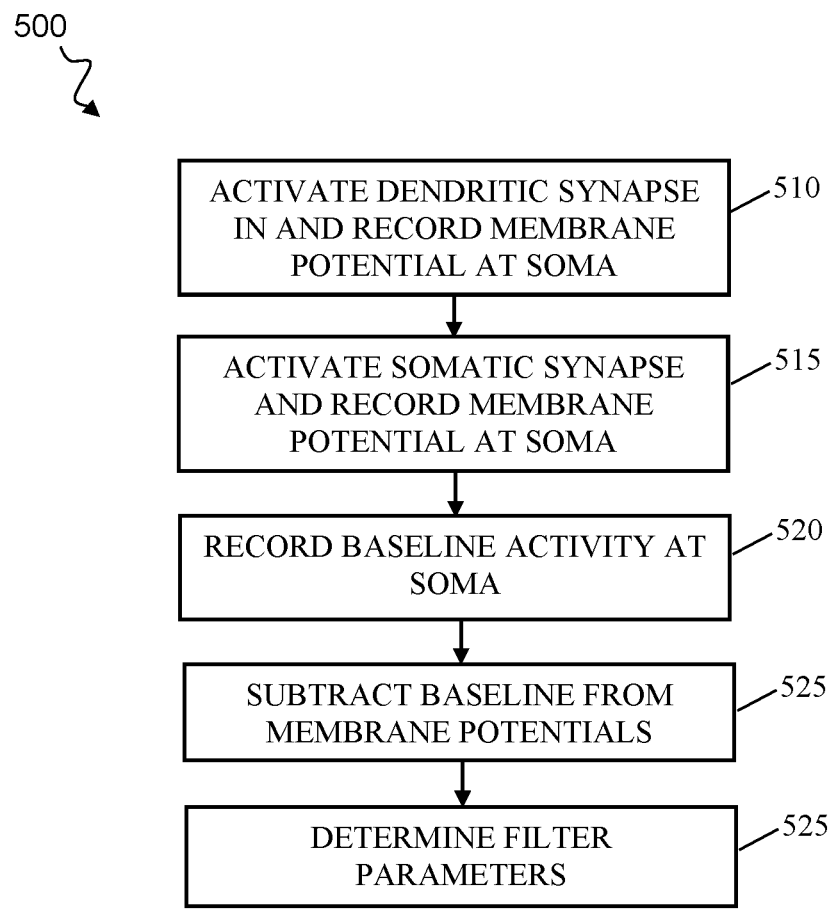
FIG. 5 is a flowchart of a process for estimating the parameters of a filter using direct filter extraction.

FIG. 5 is a flowchart of a process 500 for estimating the parameters of a filter using direct filter extraction. In some implementations, process 500 can be performed as part of a soma-synaptic correction in a process for simplifying neural network models (e.g., at 105 in process 100, FIG. 1).

The system performing process 500 activates a synapse at a dendrite at 510. The system also records the transmembrane potential at the soma of the neuron on which the activated dendritic synapse is located. In general, a synapse can be activated by modelling the input of a current at the synapse. However, in some implementations, a synapse can be activated by modelling the input of a voltage or even a chemical signal to the synapse. In general, the input signal will be sufficient to either trigger an electrical response (generally, a spike) that propagates (or inhibits the propagation of an electrical signal) to the soma of the neuron on which the dendritic synapse is located. Transmembrane potential at the soma can be recorded for the time span during and after the arrival of the electrical response at the soma (or the time span during and after the time when an inhibited electrical signal would have otherwise arrived).

The system performing process 500 also selects and activates a synapse that is at the soma at 515. The system also records the resultant transmembrane potentials at the same soma.

The system performing process 500 also records baseline activity at the soma at 520. The baseline activity embodies the transmembrane potentials at the soma in the absence of intentional activation of either a dendritic or somatic synapse.

The system performing process 500 also subtracts the recorded baseline transmembrane potentials from the transmembrane potentials recorded with activation of the somatic synapse and the dendritic synapse. This subtraction can be expressed as $$V^D(t) = V_S^D(t) - V_S(t)$$

$$V^S(t) = V_S^S(t) - V_S(t) \qquad \text{Equations 4, 5}$$

where $V^D_S(t)$ is the transmembrane potential recorded with activation of a dendritic synapse, $V^S_S(t)$ is the transmembrane potential recorded with activation of the somatic probe, and $V_S(t)$ is the baseline transmembrane potential.

The resulting difference $V^D(t)$ embodies the change in the transmembrane potential at the soma with activation of a dendritic probe synapse. The resulting difference $V^S(t)$ embodies the change in the transmembrane potential at the soma with activation of a synapse at the soma.

The system performing process 500 also determines the parameters of a filter that mimics the changes to synaptic current that result when the dendritic synapse is moved to the soma at 520. In some embodiments, the parameters can be computed by computing a kernel $\kappa(t)$ that, when convolved with $K_S(t)$ (a somatic input kernel) and the synaptic input current $I_{syn}$, yields a transmembrane potential at the soma $V^{S'}$ that approximates $V^D$ (i.e., the transmembrane potential at the soma with activation of a dendritic synapse). In other words, $$V^{S'}(t) = K_S(t) * (\kappa(t) * i_{syn}(t)), \qquad \text{Equation 6}$$

where $V^{S'}(t)$ is approximately equal to $V^D(t)$ and $K_S(t)$ is a somatic input kernel that, when convolved with the synaptic input current $i_{syn}$, yields $V^S(t)$ (i.e., transmembrane potential at the soma with activation of a synapse at the soma), or $$V^S(t) = K_S(t) * i_{syn}(t). \qquad \text{Equation 7}$$

In some implementations, kernel $\kappa(t)$ can be approximated as a single exponential function.

$$\kappa_1(t) = \frac{w}{\tau} e^{-\frac{t}{\tau}} \approx \kappa(t). \qquad \text{Equation 8}$$

Please note that convolving the synaptic current of a dendritic synapse with this exponential function is equivalent to Equation 1.

Convolutions in the time domain are equivalent to multiplication in the Fourier domain. Thus, the kernel $\kappa$ can be determined using a transmembrane potential at the soma $V^{S'}(\omega)$ that approximates $V^D(\omega)$ and is the product of the synaptic input current $i_{syn}(\omega)$, $K_S(\omega)$, and the kernel $\kappa(\omega)$ in the Fourier domain, or $$V^{S'}(\omega) = K_S(\omega) \kappa(\omega) i_{syn}(\omega). \qquad \text{Equation 9}$$

where $K_S(\omega)$ maps the relationship between the transmembrane potential at the soma with activation of a synapse $V^S(\omega)$ and the synaptic input current $I_{syn}(\omega)$, or $$V^S(\omega) = K_S(\omega) i_{syn}(\omega), \qquad \text{Equation 10}$$

Substituting Equation 10 into Equation 9 yields $$V^{S'}(\omega) = \kappa(\omega) V^S(\omega). \qquad \text{Equation 11}$$

or, since $V^{S'}$ approximates $V^D$ $$\kappa(\omega) = \frac{V^D(\omega)}{V^S(\omega)} \qquad \text{Equation 12}$$

As discussed above, the kernel $\kappa(t)$ can be approximated as a single exponential function. The Fourier transform of a single exponential function $ce^{at}(a<0)$ is given by the fraction $c/i\omega+a$. This fraction can be fit to $\kappa(\omega)$, with the time constant $\tau$ given by $-1/a$ and amplitude $w/\tau$ given by $-c/a$.

Figure 6:
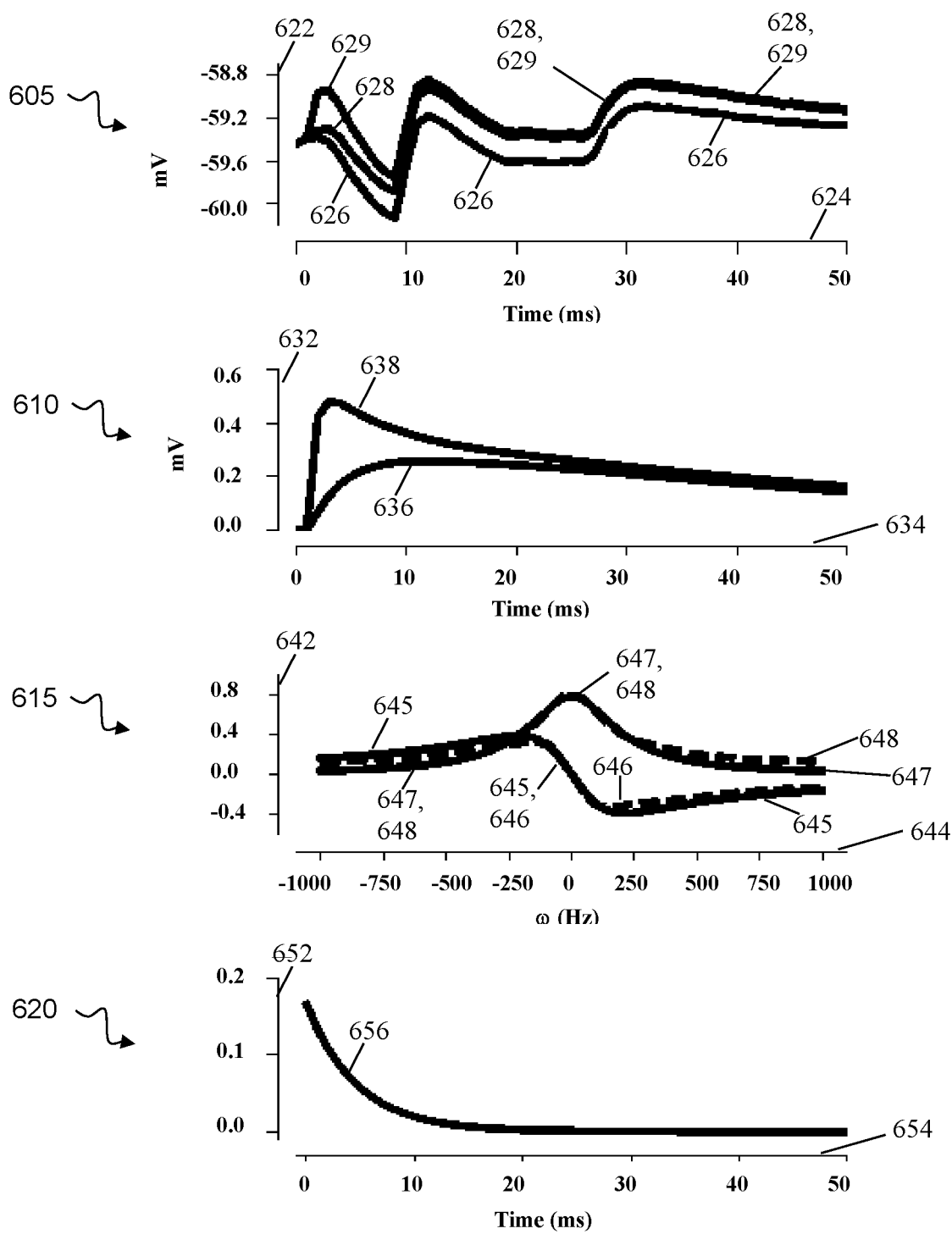
FIG. 6 is a collection of graphs each illustrating the estimation of filter parameters for a single synapse using direct filter extraction.

FIG. 6 is a collection of graphs 605, 610, 615, 620 each illustrating the estimation of filter parameters for a single excitatory synapse using direct filter extraction.

In particular, graph 605 includes an X-axis 622 and a Y-axis 624. Position along X-axis 622 indicates time in ms, with time=0 indicating when an electrical signal arrives at the soma. Position along Y-axis 624 indicates the transmembrane potential at the soma in mV. Three curves 626, 628, 629 are plotted on graph 605. Curve 626 is the bottom-most curve and indicates $V_S(t)$ the baseline transmembrane potential. Curve 628 indicates $V^D_S(t)$ the transmembrane potential recorded with activation of the dendritic probe synapse. This particular dendritic synapse is on an L5 pyramidal cell at a path-distance of 230 micrometers from the soma. Curve 629 indicates $V^S_S(t)$ the transmembrane potential recorded with activation of the synapse at the soma.

Graph 610 includes an X-axis 632 and a Y-axis 634. Position along X-axis 632 indicates time in ms, with time=0 indicating when an electrical signal arrives at the soma. Position along Y-axis 634 indicates the difference in transmembrane potential between at the soma in mV. Two curves 636, 638 are plotted on graph 610. Curve 636 is the bottom-most curve and indicates the difference in transmembrane potential between $V^S_S(t)$ the transmembrane potential recorded with activation of the dendritic synapse and $V_S(t)$ the baseline transmembrane potential (Equation 4). Curve 638 is the upper-most curve and indicates the difference in transmembrane potential between $V^S_S(t)$ the transmembrane potential recorded with activation of the somatic synapse and $V_S(t)$ the baseline transmembrane potential (Equation 5).

Graph 615 includes an X-axis 642 and a Y-axis 644. Position along X-axis 642 indicates frequency in Hz. Position along Y-axis 644 indicates the magnitude of the frequency domain response. Four curves 645, 646 and 647, 648 are plotted on graph 615. Curve 645 indicates the real component of the frequency domain response of a fitted single exponential filter extracted from the baseline-subtracted dendritically and somatically activated postsynaptic responses (graph 610). Curve 646 indicates the imaginary component of the frequency domain response of a fitted single exponential filter extracted from the baseline-subtracted dendritically and somatically activated postsynaptic responses (graph 610). Curve 647 indicates the real component of the frequency domain response of a the dendritic filter extracted from the baseline-subtracted dendritically and somatically activated postsynaptic responses (graph 610). Curve 648 indicates the imaginary component of the frequency domain response of the dendritic filter extracted from the baseline-subtracted dendritically and somatically activated postsynaptic responses (graph 610).

Graph 620 includes an X-axis 652 and a Y-axis 654. Position along X-axis 652 indicates time in ms. Position along Y-axis 654 indicates the magnitude of the time-domain impulse response. A single curve 656 is plotted on graph 620. Curve 656 the magnitude of the time-domain impulse response of single exponential filter, with the parameters of τ=4.65 ms and w=0.77.

Figure 7:
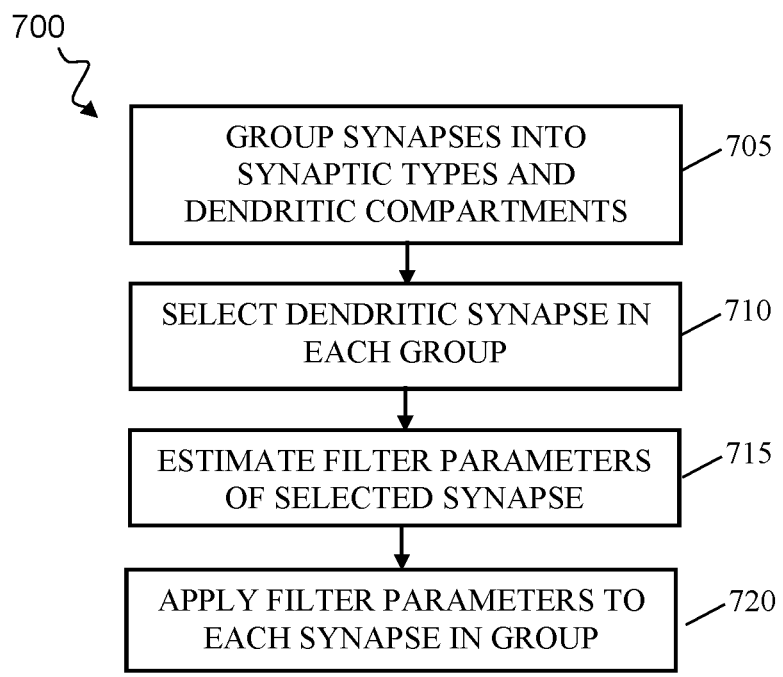
FIG. 7 is a flowchart of a process for estimating the parameters of large numbers of synapses.

FIG. 7 is a flowchart of a process 700 for estimating the parameters of large numbers of synapses. Without any limits on computational intensity, filter parameters can be estimated for every individual synapse using direct filter extraction. However, in view of computational limits, filter parameters can be estimated directly from individual probe synapses that are representative of numbers of synapses. The filter parameters of these representative probe synapses can be used as estimates of the filter parameters of the other synapses. In some implementations, process 700 can be performed as part of a soma-synaptic correction in a process for simplifying neural network models (e.g., at 105 in process 100, FIG. 1).

The system performing process 700 groups synapses in a morphologically-detailed model into groups defined by virtue of the characteristics and position of the synapses at 705. For example, in some implementations, the synapses can be grouped on the basis of dendritic compartment and the type of synapse. A dendritic compartment is a dendrite structure that can be viewed as a discrete, if simple, computational element. In some instances, a dendritic compartment can include multiple dendrites and associated spines that are generally located in a same vicinity and that can be modeled as interoperating to form a computational element. A dendritic compartment can include multiple synapses of the same type. In some implementations, synapses can be grouped, e.g., on the basis of functional subunits or the dendritic territory of the dendrites on which the synapses are found.

As for type, synapses—even synapses of different types of neurons—can be grouped into types according to their synaptic properties. These properties include excitatory vs. inhibitory effects, the ratio of NMDA/GABAB in the synapse, the synaptic decay time constant, and the like. For example, in some morphologically-detailed models, the number of different types of synapses is 7.22±2.6. In some morphologically-detailed models, the maximum number of different types of synapses is 12.

The system performing process 700 also selects a representative probe dendritic synapse within each group of synapses at 710. A probe dendritic synapse can be selected from amongst the synapses in the group based on how representative the probe synapse is of the characteristics of the synapses in the group. For example, synaptic parameters such as, e.g., excitatory vs. inhibitory effects, the ratio of NMDA/GABAB, and/or synaptic decay time constant can be averaged for the synapses in the group. A synapse in the group that has characteristics close to this/these average(s) can be selected as the probe synapse.

The system performing process 700 also estimates the filter parameters of each of the selected probe dendritic synapses at 715. For example, the filter parameters can be estimated using direct filter estimation. In some implementations, process 500 (FIG. 5) can be used.

The system performing process 700 also applies the estimated filter parameters of the selected probe dendritic synapses to other synapse in the same group at 720.

Neuron Simplification

As discussed above, although neuron simplification inevitably loses some of the biophysical complexity of a neuron that is found in a morphologically-detailed model, a network of even simplified neurons may provide insights into network behavior and/or meaningful data processing capabilities.

Figure 8:
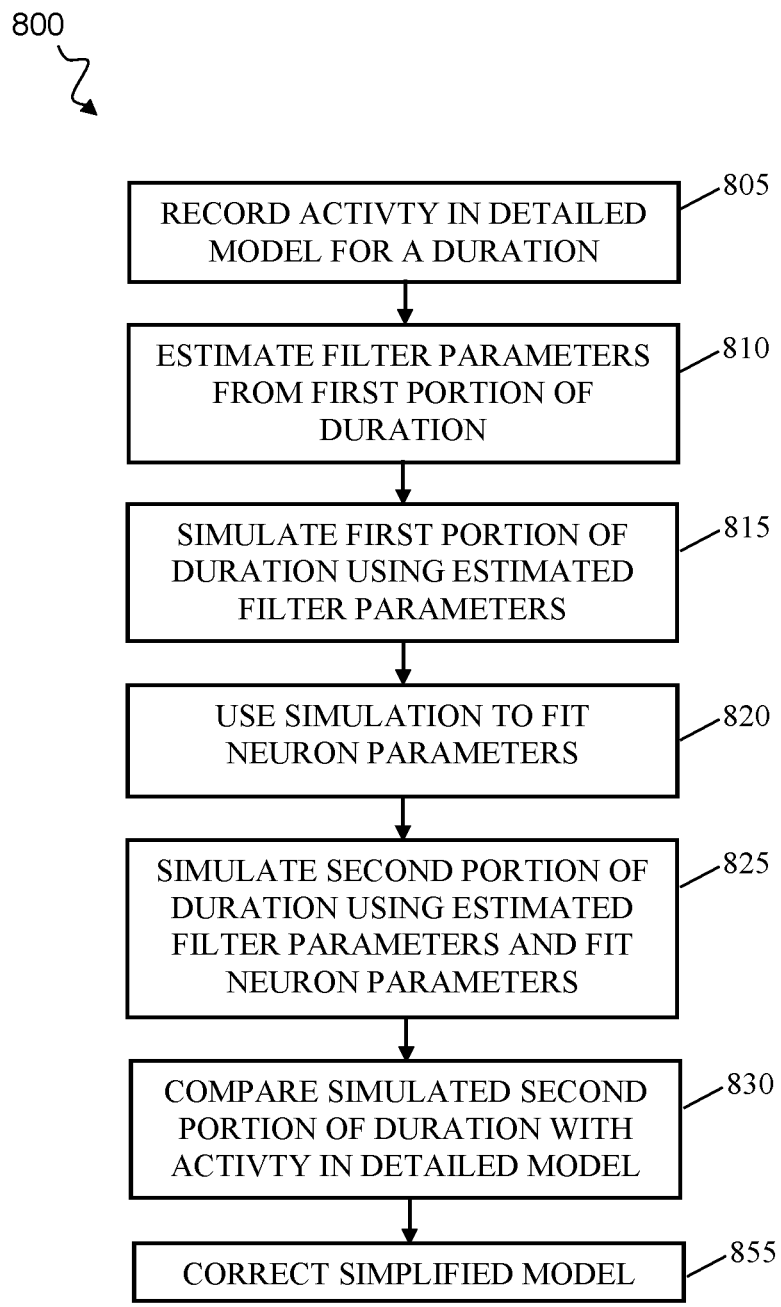
FIG. 8 is a flowchart of a process 800 for neuron simplification.

FIG. 8 is a flowchart of a process 800 for neuron simplification. In some implementations, process 800 can be performed in a process for simplifying neural network models (e.g., at 110 in process 100, FIG. 1).

The system performing process 800 records activity in a morphologically-detailed model of a neural network for a duration of time at 805. In some implementations, the morphologically-detailed model can include extensive detail regarding, e.g., location and characteristics of synaptic connections, the morphology of neurons, the structure and distribution of chemoreceptors, membrane properties, and other real-world detail.

In some implementations, the activity in the morphologically-detailed model is simulated multiple times at different physiological conditions. The different physiological conditions can be dispersed on either side of an operating point that mimics the physiological condition in vivo. For example, in some implementations, the activity can be simulated at different depolarization levels (e.g., at rheobase percentages ranging between 93 and 120%). As another example, the activity can be simulated at different extracellular calcium concentrations.

The system performing process 800 estimates filter parameters for each synapse in the morphologically-detailed model of the neural network from the data recorded during a first portion of the duration of time at 810. The first portion of the duration is less than the complete duration of time recorded at 805. As discussed above, the parameters of the filters can be estimated using, e.g., one or more of process 200 (FIG. 2), process 500 (FIG. 5), or process 700 (FIG. 7).

Using the estimated filter parameters, the system performing process 800 moves each the synapses into the soma of its respective neuron and simulates a portion of the duration of time using the resulting model at 815. For example, the synapses of the morphologically-detailed model of the neural network can be replaced by filters which approximate their behavior. However, other biophysical detail in the morphologically-detailed model can remain in the model during the simulation. In some implementations, the simulated duration is the same duration used to estimate the filter parameters for each synapse.

Using the simulation, the system performing process 800 fits the parameters of the neurons in the simplified model to the recorded behavior of the morphologically-detailed model at 820. The exact parameters to be fit can depend on the exact nature of the simplified neural network model.

In some implementations, the parameters of the neuron can be fit to the recorded behavior using, e.g., a fitting process such as described in Pozzorini et al. in "Automated High-Throughput Characterization of Single Neurons by Means of Simplified Spiking Models," PLoS Comput. Biol. 11(6), e1004275. For example, in some implementations, both the spike-triggered current η(t) in the neuron and the spike-triggered firing threshold γ(t) in the neuron can each be modeled using three exponential functions. In some implementations, timescales for exponential functions that model the spike-triggered firing threshold γ(t) can be fixed (e.g., to 10, 50, and 250 ms) so that only the amplitudes need to be fit. In some implementations, a kernel η'(t) for the spike-triggered current η(t) can be extracted using rectangular basis functions.

In some implementations, the parameters that are fit can include a refractory period and $\lambda_0$, which is a constant (in Hz) that is used to determine a conditional firing intensity. In particular, $\lambda_0$ is multiplied by an exponential raised to the momentary difference between the membrane potential and the firing threshold and divided by the level of stochasticity to give the conditional firing intensity.

Using the estimated filter parameters and the fit parameters of the neuron, the system performing process 800 also simulates a second portion of the duration of the recorded activity in the morphologically-detailed model at 825. This second portion of the duration does not overlap with the first portion used to estimate filter parameters and fit parameters of the neuron and thus can be used to validate the estimate and fit parameters.

The system performing process 800 also compares the simulated second portion of the activity with the recorded second portion of the activity in the morphologically-detailed model at 830. This comparison is a validation of the estimation of the filter parameters and the fit of the parameters of the neuron.

Depending on the results of the comparison, the system performing process 800 can also correct the simplified model at 835 (if needed). The correction can be performed in a number of different ways. For example, in some implementations, neurons that are modeled using too little information (e.g., that carry fewer than 5 spikes during the first portion of the duration) can be discarded from the simplified model. As another example, in some implementations, neurons that are inactive during the second portion of the recorded activity and hence are not properly validated can be discarded from the simplified model. As another example, in some implementations, neurons with excessively large unexplained variations in transmembrane potential (e.g., mean variance explained of membrane potential fluctuations of <40%) can be discarded from the simplified model. As another example, in some implementations, neurons with excessively large stochasticity (e.g., a stochasticity parameter of >2 mV) can be discarded from the simplified model.

As another example, the system performing process 800 can adjust estimates specific filter parameters. For example, in some implementations, the inhibitory effect of certain synapses on pyramidal neurons can be reduced in the simplified model.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of embodiments have been described. Nevertheless, it will be understood that various modifications may be made. Accordingly, other implementations are within the scope of the following claims.

What is claimed is:

1. A method for simplifying a neural network model, the method comprising:
   providing the neural network model to be simplified, the neural network model comprising a first, neuron having an arborized projection that connects to a second neuron and to a third neuron, wherein the arborized projection is to convey input from the second neuron and the third neuron to the first neuron;
   defining a first temporal filter for the conveyance of input from the second neuron to the first neuron along the arborized projection and defining a second temporal filter for the conveyance of input from the third neuron to the first neuron along the arborized projection, wherein the first temporal filter differs from the second temporal filter, wherein defining the first and second temporal filters comprises estimating an effective attenuation and delay that input from a respective of the second and the third neuron to the first neuron experiences along the arborized projection, wherein the estimations are conducted with a presumed average background activity within the neural network model;
   replacing, in the neural network model,
      the arborized projection with
         i) a first connection extending between the first neuron and the second neuron, wherein the first connection filters input from the second neuron in accordance with the first temporal filter and
         ii) a second connection extending between the first neuron and the third neuron, wherein the second connection filters input from the third neuron in accordance with the second temporal filter.

2. The method of claim 1, wherein the first and second temporal filters are convolutional filters.

3. The method of claim 1, wherein the first and second temporal filters are exponential functions.

4. The method of claim 1, wherein estimating the effective attenuation and the delay comprises
   estimating a first effective attenuation and a first delay for the second neuron, and
   estimating a second effective attenuation and a second delay for the third neuron based on the first effective attenuation and the first delay.

5. The method of claim 1, wherein defining the first temporal filter comprises:
   calculating a signal conveyed to the first neuron in response to the input from the second neuron along the arborized projection; and
   calculating a kernel that yields the same signal being conveyed to the first neuron but in response to the input from the second neuron being located at the first neuron.

6. The method of claim 5, wherein calculating the kernel comprises determining a ratio of
   a) the input from the second neuron along the arborized projection, expressed in the frequency domain
to
   b) the signal conveyed to the first neuron in response to the input, expressed in the frequency domain.

7. The method of claim 6, wherein the first neuron is a point neuron model.

8. The method of claim 6, wherein:
   the method further comprises classifying the arborized projection of the first neuron as either a basal projection or an apical projection; and
   the defining of the first temporal filter or the first weight and the second temporal filter of the second weight is based on the classification of the arborized projection.

9. The method of claim 6, further comprising:
   defining a first delay for the conveyance of input from the second neuron to the first neuron along the arborized projection; and
   defining a second delay for the conveyance of input from the third neuron to the first neuron along the arborized projection, wherein the first delay differs from the second delay.

10. A method for simplifying a neural network model, the method comprising:
    providing the neural network model to be simplified, the neural network model comprising a first neuron having an arborized projection that connects to a second neuron and to a third neuron, wherein the arborized projection is to convey input from the second neuron and the third neuron to the first neuron;
    defining a first weight for the conveyance of input from the second neuron to the first neuron along the arborized projection, wherein the first weight is defined to model a first effective post-synaptic response for a first synapse of a nerve cell;
    defining a second weight for the conveyance of input from the third neuron to the first neuron along the arborized projection, wherein the first weight differs from the second weight and wherein the second weight is defined to model a second effective post-synaptic response for a second synapse of the nerve cell;

replacing, in the neural network model the arborized projection with
- i) a first connection extending between the first neuron and the second neuron, wherein the first connection weights input from the second neuron in accordance with the first weight and
- ii) a second connection extending between the first neuron and the third neuron, wherein the second connection weights input from the third neuron in accordance with the second weight.

11. The method of claim 10, wherein the first neuron is a point neuron model.

12. The method of claim 10, wherein:

the first neuron comprises a plurality of arborized projections that each connects to a plurality of other neurons; and the method further comprises
- defining respective temporal filters for each connection of each of the arborized projections and
- replacing, in the neural network model, the arborized projections with connections that extend between the first neuron and respective of the plurality of other neurons, wherein each connection filters input from one of the neurons in accordance with the respective temporal filter.

13. The method of claim 10, wherein:

the neural network model to be simplified comprises a plurality of neurons each having at least one arborized projection that connects to others of the neurons;

the method further comprises
- defining temporal filters for each of the connections of the arborized projections and
- replacing, in the neural network model, the arborized projections with connections extending between the neurons, wherein each connection filters input in accordance with a respective of the temporal filters.

14. The method of claim 13, wherein the plurality of neurons are grouped into categories.

15. The method of claim 14, wherein the defining of temporal filters is based on the category of the classification.

16. The method of claim 9, wherein:

the method further comprises classifying the arborized projection of the first neuron as either a basal projection or an apical projection; and the defining of the first weight and the second weight is based on the classification of the arborized projection.

17. The method of claim 9, further comprising:

defining a first delay for the conveyance of input from the second neuron to the first neuron along the arborized projection; and defining a second delay for the conveyance of input from the third neuron to the first neuron along the arborized projection, wherein the first delay differs from the second delay.

18. The method of claim 9, wherein:

the method further comprises classifying a first arborized projection that has an excitatory contact at a distance as a basal projection and classifying a second arborized projection that has an excitatory contact at the same distance as an apical projection; and an attenuation due to a temporal filter of the excitatory contact of the first arborized projection is less than an attenuation due to a temporal filter of the excitatory contact of second arborized projection.

19. The method of claim 14, wherein the plurality of neurons are grouped into morphological subtypes.

* * * * *

UNITED STATES PATENT AND TRADEMARK OFFICE
CERTIFICATE OF CORRECTION

PATENT NO. : 11,301,750 B2
APPLICATION NO. : 15/942765
DATED : April 12, 2022
INVENTOR(S) : Henry Markram et al.

It is certified that error appears in the above-identified patent and that said Letters Patent is hereby corrected as shown below:

On the Title Page

Column 1, Line 14, item (72), delete "Eculbens" and insert -- Ecublens --, therefore.

In the Claims

In Column 16, Line 34 (Claim 7), delete "claim 6," and insert -- claim 1, --, therefore.

In Column 16, Line 36 (Claim 8), delete "claim 6," and insert -- claim 1, --, therefore.

In Column 16, Line 43 (Claim 9), delete "claim 6," and insert -- claim 1, --, therefore.

Signed and Sealed this
Fifth Day of July, 2022

Katherine Kelly Vidal
*Director of the United States Patent and Trademark Office*